The present invention relates to a new and improved method for cladding refractory articles. More particularly, it relates to a means for fabricating vacuum tight, clad, refractory articles where consistent sizes and shapes are essential.

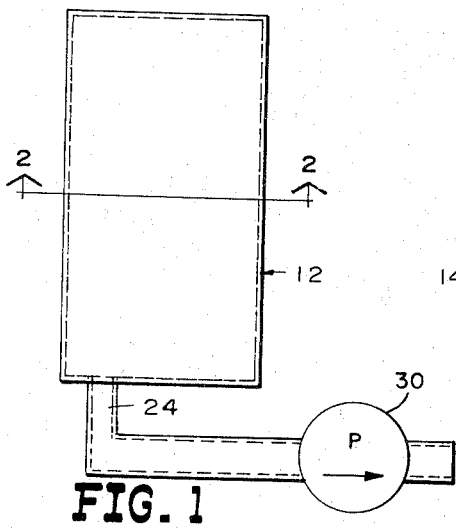
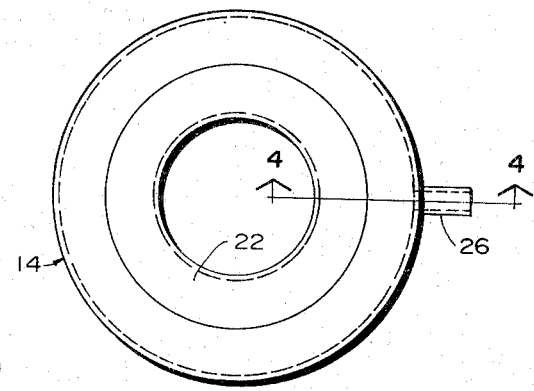
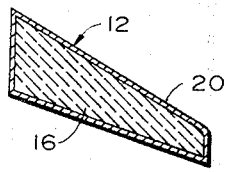
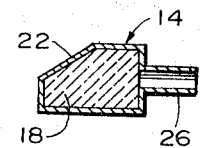
FIG. 1  FIG. 3
FIG. 2  FIG. 4
INVENTOR.
John H. Bruns Jr., Allen C. Ihrig, Luther W. Knapp
BY
Clarence R. Patty
ATTORNEY 3,355,793
METHOD OF MAKING A REFRACTORY DELIVERY APPARATUS AND APPARATUS PRODUCED THEREBY
John H. Bruns, Jr., and Allen C. Ihrig, Corning, and Luther W. Knapp, Big Flats, N.Y., assignors to Corning Glass Works, Corning, N.Y., a corporation of New York
Filed Apr. 24, 1964, Ser. No. 362,429
9 Claims. (Cl. 29—421)

In the past, bare refractory blocks were an integral part of a glass delivery system. Molten glass flowing over bare refractory delivery system parts tended to erode the refractory surfaces. This slow destruction of the parts changed the size and shape of the refractory system.

Often, this wearing away occurs in a short period of time. High glass pull and high glass temperatures increase the rate of deterioration. Some glasses, due to chemical incompatibility, require special refractory compositions which are of a less durable material; thus refractory life is diminished.

As this wearing away occurs, the operation of the process suffers, and downtime must be scheduled to replace worn parts. Downtime is economically undesirable because it is time-consuming, expensive, and results in loss of valuable production. In addition, thermal stress cracks on the glass-contact surfaces often result in rejected ware due to stones, seeds, blisters and cord.

In past practice attempts have been made to minimize the foregoing problems by covering the glass-contact surfaces of the refractory parts with a layer or liner of a compatible refractory metal, such as platinum or a platinum alloy sheet. This liner was fabricated by hand to suitably fit the shape of the refractory backer as accurately as possible. It was virtually impossible to provide a tight union between the liner and its refractory backer. When the composite structure is elevated in temperature, a differential thermal expansion between the platinum liner and the refractory backer allows the liner to distort and become deformed. As a result of the deformation, the output efficiency of the process is reduced and often a part replacement is required. A poor fit does not give sufficient support to prevent a mechanical deformation of the platinum.

Our invention not only alleviates the difficulty of obtaining a tight union between the refractory and the liner, but also provides a non-deformable glass contact surface to the flowing molten glass. Basically our invention relates to a new means for fabricating vacuum tight, encapsulated, refractory, delivery system parts.

Our invention has as one of its objects a method and apparatus for providing refractory articles with a long life expectancy.

A further object of our invention is to provide a method and apparatus for fabricating refractory articles with dimensional stability, thus giving consistent shape and consistent size.

Another object of our invention has been to provide a method and apparatus for fabricating a vacuum tight, clad, refractory article to improve glass quality, such that erosion, cracking or spalling of refractory in contact with the glass is eliminated.

An additional object of our invention has been a method and apparatus for construction of complex refractory orifice or delivery system shapes from easily fabricatable refractories, which are incompatible with glasss, by encasement in a tight adhering, evacuated refractory metal casing.

Other objects and advantages of the invention will be shown in the following detailed description of a preferred embodiment thereof as illustrated in the accompanying drawings in which:

FIG. 1 is a plan view of a delivery system lip block constructed in accord with the invention.

FIG. 2 is a sectional view of the lip block taken along line 2—2 in FIG. 1.

FIG. 3 is a plan view of a delivery system orifice ring constructed in accord with the invention.

FIG. 4 is a sectional view of the orifice ring taken along line 4—4 in FIG. 3.

In practicing the invention, complex delivery system parts, such as lip block 12 and orifice ring 14 can be constructed. Refractory 16 for lip block 12 and refractory 18 for orifice ring 14 are relatively easy to fabricate from suitable refractory materials. Refractories 16 and 18 have various desirable properties, such as compressive strength, but are not necessarily compatible with glass and often erosion occurs. By practicing our invention the desirable properties can be put to use and the incompatible properties can be eliminated by covering refractories 16 and 18 with a tight adhering, evacuated casing 20 and 22, respectively.

Thus refractory parts are encased on all sides with a suitable refractory metal envelope. This envelope is completely closed with the exception of a tube, such as evacuation tube 24 penetrating platinum casing 20 of lip block 12 and evacuation tube 26 penetrating platinum casing 22 of orifice ring 14. The tube may be constructed of sufficient length to clear the outside of the assembled refractory structure. In this way the tube is connected to a vacuum pump 30 or other suitable vacuum source and the encapsulated refractory is pumped down to approximately 25 to 30 inches of vacuum.

The continuous use of a vacuum pump while preferred, is not essential. The clad refractory part can be evacuated and sealed off by permanently closing the evacuation tube. This may be accomplished by heating the tube, and then compressing the walls of the tube to weld the walls together and prevent the re-entrance of atmospheric pressure.

The relatively ductile and thin refractory metal, such as platinum and its alloys, is drawn down into intimate contact with the refractory backer surfaces, and is held rigidly in place. As differential expansion occurs during passage of the flowing molten glass, the flat, glass contact surfaces remain flat and undistorted. We thus have provided a stable, consistent surface which does not change or wear away.

A refractory part, such as orifice ring 14, is precise and accurate. The ring is clad and evacuated, and the platinum casing may be hydrostatically pressed on the refractory backer. Hydrostatic pressing adds a further refinement to our invention having forced the platinum cladding into tight intimate contact with all parts of the refractory backer. That is, platinum is actually pressed into surface pores in the refractory and is mechanically gripped tightly therein. Intentional scoring of the refractory part may also be used to increase the mechanical bond. Critical surfaces may then be machined to provide desired accuracy.

While certain forms of the invention have been shown and described herein it will be readily apparent to those skilled in the art that many modifications and alterations may be made without departing from the spirit of the invention or the scope of the appended claims.

We claim:

1. A process of cladding a bare refractory delivery system part comprising sheathing the bare refractory delivery system part with a liner of refractory metal, substantially removing atmospheric pressure from between the liner and the delivery system part through an evacuation tube; and compressing the evacuation tube thereby preventing atmosphere from re-entering the liner.

2. A process of encapsulating critical glass contact delivery system parts comprising encapsulating the delivery system parts in an envelope of refractory metal; withdrawing, through an evacuation tube in the envelope, substantially all internal pressure between the envelope and the delivery system part; and constricting the evacuation tube to prevent re-entry of atmospheric pressure.

3. A process of manufacturing a glass delivery system article comprising fabricating a bare refractory backer; cladding the refractory backer surfaces with a layer of thin ductile refractory metal; and continuously evacuating the refractory metal layer as molten glass passes across the assembly.

4. A process for fabricating vacuum tight refractory metal clad glass delivery system parts comprising essentially the steps of shaping a suitable refractory stock piece into a delivery system part form; fabricating a suitable refractory metal sheet to the prescribed general contour of the delivery system part; suitably uniting the contoured refractory metal to form a contoured enevlope with an evacuation tube exit, evacuating the envelope of atmospheric pressure through the evacuation tube; and compressing the evacuation tube when the envelope is evacuated to prevent re-entry of atmospheric pressure.

5. A composite body suitable for contact with molten glass, said body comprising:
 a base structure comprising a material erodible by molten glass,
 a thin casing substantially covering at least a portion of said base structure, said casing comprising a deformable refractory material having a thermal expansion different from the thermal expansion of said base material and capable of withstanding continuous contact with molten glass, and
 a vacuum source in continuous communication with the interior of said casing and continuously maintaining the interior of said casing at a pressure lower than the ambient pressure, whereby the differential between said ambient pressure and the pressure within said casing produced by said vacuum source continuously maintains said casing in close contact with said base structure, thereby providing a glass contacting surface that remains undistorted while in contact with molten glass.

6. A composite body according to claim 5 in which said casing comprises platinum.

7. A composite body according to claim 5 in which said casing comprises a platinum alloy.

8. A composite body according to claim 5 wherein said vacuum source comprises a vacuum pump.

9. The method of maintaining a refractory casing in intimate contact with a base structure during contact between said casing and molten glass which comprises the steps of:
 maintaining said casing in generally air-tight sealing relationship with and covering at least a portion of said base structure, while
 continuously applying a vacuum between said casing and said base structure, whereby pressure on the exterior surface of said casing produces a net force on said casing tending to urge said casing into contact with said case structure.

References Cited
UNITED STATES PATENTS

| | | | |
|---|---|---|---|
| 2,101,996 | 12/1937 | Gerstenberg | 29—421 |
| 2,427,597 | 9/1947 | Garner et al. | 29—470.1 X |
| 2,666,979 | 1/1954 | Van Dusen | 53—9 |
| 2,673,373 | 3/1954 | Heuer | 29—421 |

THOMAS H. EAGER, *Primary Examiner.*